Patented Mar. 18, 1924.

1,486,955

UNITED STATES PATENT OFFICE.

LE ROY S. DUNHAM, OF BLOOMFIELD, NEW JERSEY, ASSIGNOR TO NEW JERSEY PATENT COMPANY, OF WEST ORANGE, NEW JERSEY, A CORPORATION OF NEW JERSEY.

ELECTRODE ELEMENT FOR GALVANIC BATTERIES AND METHOD OF PRODUCING THE SAME.

No Drawing.      Application filed February 21, 1922.   Serial No. 538,350.

*To all whom it may concern:*

Be it known that I, LE ROY S. DUNHAM, a citizen of the United States, and a resident of Bloomfield, Essex county, New Jersey, have invented certain new and useful Improvements in Electrode Elements for Galvanic Batteries and Methods of Producing the Same, of which the following is a description.

My invention relates to electrode elements for galvanic batteries, and more particularly to negative electrode elements for primary batteries employing a caustic alkaline electrolyte and in which the negative or depolarizing electrodes consist of elements of oxide of copper and the positive electrodes consist of elements of zinc. In some aspects the present invention is an improvement on that described and claimed in Patent No. 1,386,095, granted August 2, 1921, to Thomas A. Edison.

My invention resides in an improved negative or depolarizing electrode element for primary batteries of this character, and also in the method of producing such element.

In primary batteries of the type described, the negative or depolarizing electrode elements are usually made in the form of plates or cylinders molded from a mass of finely divided oxide of copper. At the present time these oxide of copper elements are generally produced as follows: A mass of powdered copper oxide is first moistened with a solution of caustic soda. The damp powdered copper oxide is then placed in molds of proper form and consolidated into elements of the desired shape in a hydraulic press. These elements are dried and then baked by subjecting the same to a temperature of approximately 1700° Fahrenheit for a period of several hours in a suitable furnace. During this baking operation the particles of oxide of copper are, under the action of heat, agglomerated so that the elements when cold will have sufficient strength to enable them to be shipped and used commercially without serious liability of breaking.

The method of making negative oxide of copper elements as described above, however, is objectionable for the following reasons:

1. Caustic soda is a poor binder for powdered copper oxide and accordingly an appreciable number of the molded elements are broken and crumbled in handling prior to the baking operation.

2. During the baking operation the elements shrink to such an extent that they are likely to crack, and because of this it is usually necessary to reject a considerable number of the elements. Moreover, the elements do not shrink uniformly in baking and accordingly it is almost impossible to obtain elements of uniform size.

3. The baked elements thus produced are likely to scale and disintegrate in service, and are also of a high density and of low porosity. This high density interferes with the rapid depolarization of the elements and consequently the latter have an apparent high internal resistance in service and yield a low capacity at high rates of discharge.

The principal objects of my invention are to produce an improved battery element formed of agglomerated powdered oxide of copper which will not scale or disintegrate in service and which is exceedingly porous, and in which at the same time practically all of the particles of copper oxide are firmly bound together and consolidated whereby the element will be sufficiently strong to be used commercially. The advantage which results from the increased porosity is that which follows from any increase in the exposed surface area of the oxide, namely, increased capacity at high rates of discharge, particularly at low temperatures.

A further object of my invention resides in the employment of a binder for the powdered copper oxide which, when mixed with the copper oxide and molded prior to baking, will result in unbaked molded elements much stronger than those produced in the processes usually followed, and the use of which will result in a substantially uniform shrinkage of the molded elements when the latter are baked.

I find that the foregoing objects may be attained by properly combining or incorporating with the powdered oxide of copper, from which the elements are to be formed, any of a number of volatile or decomposable materials, but preferably any of a number of crystallized salts which decompose or vaporize on heating, including copper nitrate, copper sulphate, sodium sulphate, iron sulphate, iron nitrate, ammonium sulphate, ammonium nitrate and ammonium chloride. It is also preferable, though not essential, to employ a salt containing water of crystallization. As a matter of fact, the choice of the salt used may vary widely since the principal objects of the invention are achieved more by reason of the physical characteristics of the salt and its general behavior on heating than by reason of any specific chemical reaction. Of the various materials mentioned I prefer to employ crystallized copper sulphate as I believe the same to be the most practical and efficient in attaining the desired results. Where crystallized copper sulphate is employed, I preferably proceed by first grinding copper sulphate crystals to such a fineness that the same will pass through a 100 mesh screen. However, the degree of fineness is relatively unimportant since the size of the particles merely affects the size of the pores produced in the baked element. The ground copper sulphate is then added to and thoroughly mixed in a mixing machine, with dry powdered copper oxide, from which the battery elements are to be formed, preferably in the proportion of about 10 parts by weight of the copper sulphate to 100 parts by weight of the copper oxide. The resulting mixture is moistened with sufficient water to enable the same to be satisfactorily pressed and the operation of the mixing machine is continued until the entire mixture is properly moistened. The moist batch thus produced is then removed from the mixing machine, placed in suitable molds and molded into elements or plates of the desired shape by means of a hydraulic press in the usual manner. A certain amount of the copper sulphate apparently passes into solution. The elements are now dried and during this operation the copper sulphate which passed into solution recrystallizes, with the result that the elements are considerably strengthened mechanically by the presence of such crystals. The crystals of copper sulphate which were not dissolved also doubtless act to strengthen the elements. The unbaked molded elements thus produced are not easily broken, being much stronger than the unbaked molded elements produced by the usual processes of making battery elements of copper oxide. This is undoubtedly due to the fact that the crystallized copper sulphate or other crystallized salt employed, by reason of its crystalline form, acts as a more effective binding agent for the powdered copper oxide than the binders heretofore employed. The dried molded elements are now placed in a furnace and baked in the usual manner. During the baking the copper sulphate crystals are decomposed, liberating water and oxides of sulphur and leaving voids where the crystals formerly were. This decomposition of the copper sulphate under heat also results in the formation of cupric oxide in situ in the elements. This cupric oxide formed in situ constitutes additional depolarizing material for the elements. The porosity of the elements thus produced is far greater than that of copper oxide elements produced by the methods usually employed. Accordingly, the capacity of such elements, especially at high rates of discharge and at low temperatures, is considerably greater than that of similar elements produced by the methods heretofore followed, this being due to the increase in the exposed surface area of the copper oxide. At the same time, the elements produced according to the present invention are hard and durable and sufficiently strong to be used commercially and will not scale or disintegrate in service. A further advantage is that the elements produced by my invention shrink uniformly when baked and accordingly the final baked elements will be of substantially uniform size.

I find that it makes little difference whether the copper sulphate mixed with the dry powdered copper oxide be in the form of the hydrated crystals or the anhydrous powder for, in the latter case, sufficient moisture is taken up by the anhydrous powder from the mixture upon the addition of water thereto prior to the molding operation, to crystallize the same. Where copper nitrate is used instead of copper sulphate, the results are practically the same as those described above, as copper nitrate acts in much the same way as the copper sulphate. Where copper nitrate is used, however, there is a possible added advantage due to the fact that the products of the decomposition of the copper nitrate probably aid in the oxidation of the powdered material from which the elements are formed.

It will be understood that when a salt other than one of copper is used, there will be no additional cupric oxide formed in situ during the baking operation. Otherwise there will be no essential difference in the results obtained. It is chiefly for this reason that I prefer to use copper salts, that is, so that after the principal objects of the invention have been accomplished, the residue remaining in the baked electrodes will have a value as cupric oxide depolarizing material.

It is to be understood that the process and product described herein are subject to many changes and modifications without departure from the spirit of the invention and the scope of the appended claims.

Having now described my invention, what I claim as new and desire to protect by Letters Patent, is as follows:

1. An electrode element for galvanic batteries comprising a mass of oxide of copper combined with a material comprising crystallized copper sulphate, said mass being physically and chemically altered by baking, substantially as described.

2. An electrode element for galvanic batteries comprising a mass of oxide of copper combined with a material comprising a crystallized copper salt, said mass being physically and chemically altered by baking, substantially as described.

3. An electrode element for galvanic batteries comprising a mass of oxide of copper combined with a material comprising a crystallized salt, whose crystals contain water of crystallization, said mass being physically and chemically altered by baking, substantially as described.

4. An electrode element for galvanic batteries comprising a mass of oxide of copper combined with a material comprising a crystallized salt which decomposes or vaporizes on heating, said mass being physically and chemically altered by baking, substantially as described.

5. An electrode element for galvanic batteries comprising a mass of oxide of copper combined with approximately 10% of a crystallized salt which decomposes or vaporizes on heating, said mass being physically and chemically altered by baking, substantially as described.

6. An electrode element for galvanic batteries comprising a mass of finely divided oxide of copper combined with approximately 10% of a crystallized salt which decomposes or vaporizes on heating, divided to a fineness sufficient to pass a 100 mesh screen, said mass being physically and chemically altered by baking, substantially as described.

7. An unbaked electrode element comprising a molded mass of mixed oxide of copper, water and a salt which crystallizes with water of crystallization, substantially as described.

8. An unbaked electrode element comprising a molded mass of mixed oxide of copper and a crystallized copper salt, substantially as described.

9. An unbaked electrode element comprising a molded mass of mixed oxide of copper and crystallized copper sulphate, substantially as described.

10. An unbaked electrode element comprising a molded mass of mixed oxide of copper and a crystallized salt, substantially as described.

11. An unbaked electrode element comprising a molded mass of mixed oxide of copper and approximately 10% of a crystallized salt, substantially as described.

12. An unbaked electrode element comprising a molded mass of mixed oxide of copper and approximately 10% of a crystallized salt divided to a fineness sufficient to pass a 100 mesh screen, substantially as described.

13. The method of producing an electrode element for galvanic batteries, which consists in agglomerating a mass of a mixture of oxide of copper and a crystallized salt the crystals of which contain water of crystallization, and decomposing such salt and driving off the water of crystallization during such agglomeration, substantially as described.

14. The method of producing an electrode element for galvanic batteries, which consists in mixing oxide of copper and a salt which crystallizes with water of crystallization, moistening the mixture with water, forming the moistened mixture into a molded element, and then drying such element, substantially as described.

15. The method of producing an electrode element for galvanic batteries which consists in mixing oxide of copper and a salt which crystallizes with water of crystallization, moistening the mixture with water, forming the moistened mixture into a molded element, and then baking such element, substantially as described.

16. The method of producing an electrode element for galvanic batteries, which consists in mixing oxide of copper, water and a salt which crystallizes with water of crystallization, forming the mixture into a molded element, and then heating said element at a temperature sufficient to drive off all water therefrom, substantially as described.

17. The method of producing an electrode element for galvanic batteries, which consists in forming a damp mixture of powdered oxide of copper and a crystallized salt, and then molding the mixture into an element of the desired shape, substantially as described.

18. The method of producing an electrode element for galvanic batteries, which consists in finely grinding copper sulphate crystals, mixing the finely divided copper sulphate crystals with finely divided oxide of copper, dampening the mixture with water, molding the dampened mixture into an element of the desired shape, drying such element and then baking the same, substantially as described.

19. The method of producing an electrode element for galvanic batteries, which consists in mixing powdered oxide of copper with finely divided copper sulphate, moistening the mixture with water, molding the moistened mixture into an element of the desired shape, drying such element and then baking the same, substantially as described.

20. The method of producing an electrode element for galvanic batteries, which consists in mixing powdered oxide of copper with a finely divided material which decomposes on heating and which crystallizes with water of crystallization, moistening the mixture with water, molding the moistened mixture into an element of the desired shape, and then baking said element, substantially as described.

This specification signed this 17th day of February, 1922.

LE ROY S. DUNHAM.